No. 782,895. PATENTED FEB. 21, 1905.
C. W. BREDING.
FISH ROASTER.
APPLICATION FILED MAY 23, 1904.
Fig. 1.
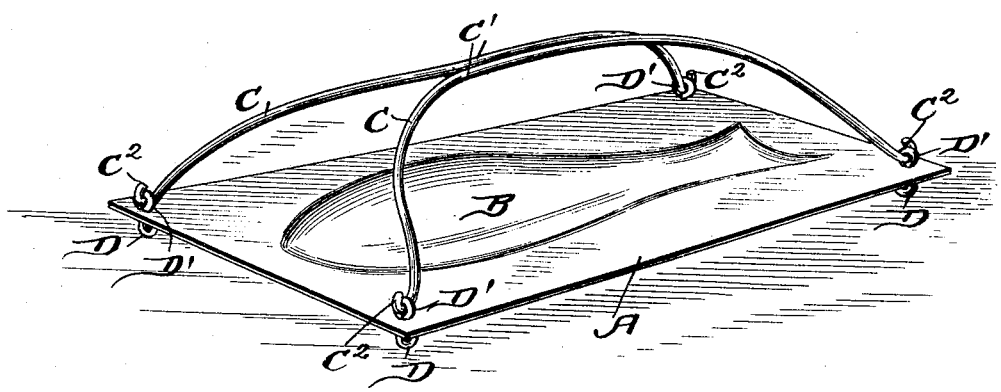
Fig. 2.
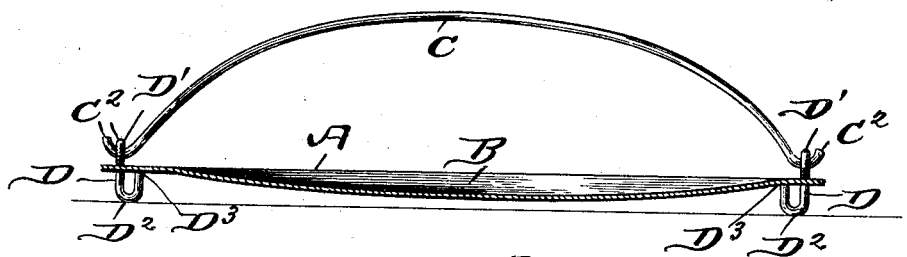
Fig. 3.
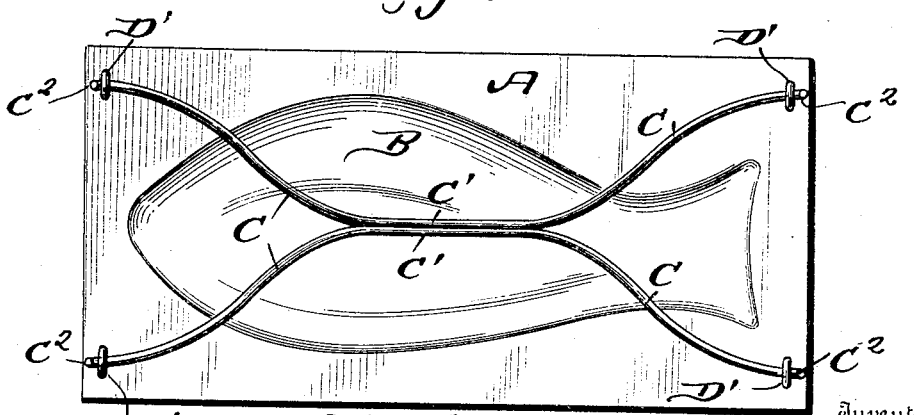
Fig. 4.
Witnesses
Inventor
C. W. Breding.

No. 782,895. Patented February 21, 1905.

UNITED STATES PATENT OFFICE.

CHARLES WILLIAM BREDING, OF CHICAGO, ILLINOIS.

FISH-ROASTER.

SPECIFICATION forming part of Letters Patent No. 782,895, dated February 21, 1905.

Application filed May 23, 1904. Serial No. 209,327.

*To all whom it may concern:*

Be it known that I, CHARLES WILLIAM BREDING, a citizen of the United States, residing at Chicago, in the county of Cook and State of Illinois, have invented a new and useful Improvement in Fish-Roasters, of which the following is a specification.

This invention is an improved form of fish-roasting device, the object being to provide a simple and efficient device by means of which a fish can be conveniently roasted; and another object is to provide a device from which the fish can be quickly and easily removed after it has been cooked; and with these objects in view my invention consists, essentially, in the employment of the flat plate having a depression the shape of which is similar to the shape of a fish, said plate resting upon short legs, the upper ends of which are formed with means for attaching handles thereto, said handles being employed for lifting and moving the roaster.

The invention consists also in certain details of construction hereinafter fully described, and pointed out in the claims.

In the drawings forming a part of this specification, Figure 1 is a perspective view of a fish-roaster constructed in accordance with my invention. Fig. 2 is a vertical sectional view of the same. Fig. 3 is a top plan view, and Fig. 4 is a detail view of one of the legs.

In carrying out my invention I employ a flat plate A, preferably made of sheet metal and having a longitudinal depression B, which is shaped after the manner of an ordinary fish. The roasters will be made in various sizes, and the size of the depression will of course vary with the size of the plate, thereby rendering the device particularly adapted for use for fish substantially the size of the depression. The plate has two handles C, pivotally connected thereto, said handles being in the form of wire bails bent inwardly, as shown at C', so that the said handles will contact with each other when in a raised position. The ends of each handle are hooked, as shown at C², and are adapted to engage the eyes D', formed upon the upper ends of the wire legs D, said legs being passed through the perforated corners of the plate A and back upon themselves, as shown at D², the ends D³ of the leg contacting with the under side of the plate A.

When it is desired to roast the fish, it is placed within the depression and the plate arranged within the oven or upon the stove, and it will of course be understood that by bringing the handles up to the position shown in the drawings the device can be quickly and easily handled. After the fish has been cooked it can be quickly and easily removed by turning the handles down and sliding the fish from the depression—an operation much more easily accomplished than removing a fish from the ordinary skillet.

It will thus be seen that I provide a cheap, simple, and efficient construction of culinary device capable of carrying out all of the objects hereinbefore referred to.

Having thus fully described my invention, what I claim as new, and desire to secure by Letters Patent, is—

1. A device of the kind described, comprising a plate having a depression, legs for supporting said plate and handles for lifting the plate, the ends of the handles being pivotally connected to the upper ends of the legs as set forth.

2. A device of the kind described comprising a plate having a depression, the wire legs having each an eye at the upper end, and the handles, the ends of which are hooked and adapted to engage the eyes of the legs, as set forth.

3. A device of the kind described comprising a plate having a depression, the legs having eyes at their upper ends, said legs being passed through the apertured corners of the plate and bent upwardly upon themselves, and the handles having their ends pivotally connected to the eyes of the legs, the intermediate portions of said handles being bent toward each other whereby they are adapted to contact when the handles are elevated, as set forth.

CHARLES WILLIAM BREDING.

Witnesses:
A. F. EKEDAHL,
ALFRED JOHNSON.